US008575302B2

(12) United States Patent
Suzuki et al.

(10) Patent No.: US 8,575,302 B2
(45) Date of Patent: Nov. 5, 2013

(54) POLYLACTIDE COMPOSITION

(75) Inventors: Hirotaka Suzuki, Iwakuni (JP);
Kiyotsuna Toyohara, Iwakuni (JP);
Shin To, Tokyo (JP)

(73) Assignees: Teijin Limited, Osaka (JP); Musashino Chemical Laboratory, Ltd., Tokyo (JP); Yoshiharu Kimura, Shiga (JP)

( * ) Notice: Subject to any disclaimer, the term of this patent is extended or adjusted under 35 U.S.C. 154(b) by 0 days.

(21) Appl. No.: 12/089,322

(22) PCT Filed: Oct. 4, 2006

(86) PCT No.: PCT/JP2006/320244
§ 371 (c)(1),
(2), (4) Date: Jun. 17, 2008

(87) PCT Pub. No.: WO2007/043547
PCT Pub. Date: Apr. 19, 2007

(65) Prior Publication Data
US 2009/0234094 A1    Sep. 17, 2009

(30) Foreign Application Priority Data

| Oct. 5, 2005 | (JP) | 2005-292399 |
| Oct. 5, 2005 | (JP) | 2005-292547 |
| Oct. 26, 2005 | (JP) | 2005-311553 |
| Oct. 26, 2005 | (JP) | 2005-311600 |

(51) Int. Cl.
*C08G 63/08* (2006.01)
*C08G 63/82* (2006.01)
*C08L 67/04* (2006.01)
*C08L 101/16* (2006.01)
*C08K 3/32* (2006.01)

(52) U.S. Cl.
USPC ........... 528/356; 528/354; 528/355; 528/357; 528/358; 524/710; 524/711; 524/712

(58) Field of Classification Search
USPC .................. 528/354–358, 287; 524/710–712
See application file for complete search history.

(56) References Cited

U.S. PATENT DOCUMENTS

| 2,024,543 | A | * | 12/1935 | Smith | 252/175 |
| 3,404,121 | A | * | 10/1968 | Barkey | 524/139 |
| 5,770,682 | A | * | 6/1998 | Ohara et al. | 528/354 |
| 7,199,173 | B2 | | 4/2007 | Shimizu et al. | |
| 2004/0068059 | A1 | * | 4/2004 | Katayama et al. | 525/466 |
| 2005/0165206 | A1 | | 7/2005 | Rafler et al. | |

FOREIGN PATENT DOCUMENTS

| EP | 1 354 908 A1 | 10/2003 |
| JP | 57-085818 A | 5/1982 |
| JP | 05-230201 A | 9/1993 |
| JP | 9-31171 A | 2/1997 |
| JP | 10-36651 A | 2/1998 |
| JP | 10-182801 A | 7/1998 |
| JP | 2862071 B2 | 12/1998 |
| JP | 2000-017164 A | 1/2000 |
| JP | 2000017164 A * | 1/2000 |
| JP | 3487388 B2 | 10/2003 |
| JP | 2005-336414 A | 12/2005 |
| WO | 2004/035476 A1 | 4/2004 |
| WO | 2005/059004 A1 | 6/2005 |

OTHER PUBLICATIONS

I. C. McNeill and H. A. Leiper; Degradation Studies of Some Polyesters and Polycarbonates—2. Polylactide: Degradation Under Isothermal conditions, Thermal Degradation Mechanism and Photolysis of the Polymer; Polymer Degradation and Stability 11 (1985) 309-326.
F,-D. Kopinke, K. MacKenzie; Mechanistic aspects of the thermal degradation of poly(lactic acid) and poly(β-hydroxybutyric acid); Journal of Analytical and Applied Pyrolysis, vol. 40-41, pp. 43-53 (1997).
Tsuji H et al: Enhanced Thermal Stability of Poly(Lactide)S in the Melt by Enantiomeric Polymer Blending; Polymer, Elsevier Science Publishers B.V., GB LNKD-DOI; 10.1016/A0032-3861 (03)00175-7, vol. 44, No. 10, May 1, 2003, pp. 2891-2896.

* cited by examiner

*Primary Examiner* — Randy Gulakowski
*Assistant Examiner* — Rachel Kahn
(74) *Attorney, Agent, or Firm* — Sughrue Mion, PLLC

(57) ABSTRACT

A composition which comprises polylactide and has excellent heat stability, color and hydrolytic resistance. The composition comprises (i) polylactide, (ii) a metal catalyst and (iii) a hypophosphorous acid-based deactivator or a metaphosphoric acid-based deactivator.

4 Claims, No Drawings

POLYLACTIDE COMPOSITION

CROSS REFERENCE TO RELATED APPLICATIONS

This application is a National Stage of International Application No. PCT/JP2006/320244 filed on Oct. 4, 2006, claiming priority based on Japanese Patent Application Nos. 2005-292399, 2005-292547, 2005-311553, and 2005-311600, filed Oct. 5, 2005, Oct. 5, 2005, Oct. 26, 2005, and Oct. 26, 2005, respectively, the contents of all of which are incorporated herein by reference in their entirety.

FIELD OF THE INVENTION

The present invention relates to a composition comprising polylactide. More specifically, it relates to a composition which has excellent heat stability, mechanical strength and color and can be kept for a long time.

DESCRIPTION OF THE PRIOR ART

Since most plastics are light and stiff, have high durability and can be easily molded into any shape, they are mass-produced to support our lives in various ways. However, when they are thrown away into the environment, they are not easily decomposed and are accumulated. When they are burnt, they produce a large amount of carbon dioxide which accelerates global warming.

In view of the above situation, studies on biodegradable plastics which are degraded by microorganisms are now under way energetically. Biodegradable plastics have an aliphatic carboxylic acid ester unit and are easily degraded by microorganisms. On the other hand, they have low heat stability, and their molecular weights tend to become lower and their colors tend to become worse in the step of exposing them to a high temperature, such as melt spinning, injection molding or melt film formation.

Out of the biodegradable plastics, polylactide is a plastic which has excellent heat resistance and good balance between color and mechanical strength. When it is compared with petroleum-based resins typified by polyethylene terephthalate and polyamide, there is a world of difference in heat stability between them. To resolve this situation, various studies on the improvement of the heat stability of polylactide have been made.

For example, patent document 1 proposes that a phosphoric acid-based compound or phosphorous acid-based compound should be added as a catalyst deactivator to polylactide when its molecular weight reaches 50,000. However, the addition of the catalyst deactivator to polylactide having a low molecular weight as in patent document 1 means that the subsequent polymerization reaction is impeded, thereby making it impossible to obtain a polymer having a high molecular weight.

Patent documents 2 and 3 propose that an acidic phosphoric acid ester or a chelating agent should be added as a catalyst deactivator to improve the heat stability of polylactide. Since the safety against toxicity of the acidic phosphoric acid ester disclosed by patent documents 2 and 3 is not ensured, when the resin is scrapped, it pollutes the environment and its use in food is limited. The chelating agent generally has low heat resistance and is baked before it captures a metal catalyst to become a serious coloring factor.

Meanwhile, it is known that the heat stability of polylactide is affected not only by a polymerization catalyst but also by the spontaneous disconnection of the main chain (refer to non-patent documents 1 and 2). The spontaneous disconnection of the main chain proceeds monolithically to produce a carbon radical, acyl radical, oxo radical or carboxyl radical, thereby causing the production of a lactide by depolymerization and an increase in the amount of a coloring component such as a pyruvic acid derivative due to a rebonding or dehydrogenation reaction, or disproportionation.

To improve the heat stability, color and hydrolytic resistance of polylactide while retaining its safety, further improvement must be made on the suppression of depolymerization caused by the residual catalyst and the suppression of a reduction in the molecular weight caused by the disconnection of the main chain.

(patent document 1) Japanese Patent No. 2,862,071

(patent document 2) Japanese Patent No. 3,487,388

(patent document 3) JP-A No. 10-36651

(non-patent document 1) Polymer Degradation and Stability, 1985, vol. 11, pp. 309-326, I. C. McNeil et al.

(non-patent document 2) Journal of Analytical and Applied Pyrolysis, 1997, vol. 40-41, pp. 43-53, F. D. Copinche et al.

SUMMARY OF THE INVENTION

It is therefore an object of the present invention to provide a composition which comprises polylactide and has excellent heat stability. It is another object of the present invention to provide a composition which comprises polylactide and has excellent color. It is still another object of the present invention to provide a composition which comprises polylactide and has excellent hydrolytic resistance.

The inventors of the present invention have conducted intensive studies on a deactivator which is effective for deactivating the residual catalyst contained in polylactide. As a result, they have found that when a hypophosphorous acid-based deactivator is contained in polylactide, the residual catalyst contained in polylactide can be deactivated efficiently and a composition having excellent heat stability and color is obtained. The present invention has been accomplished based on this finding.

The inventors of the present invention have also found that when a metaphosphoric acid-based deactivator is contained in polylactide, the residual catalyst and water contained in polylactide can be deactivated effectively and a composition having excellent heat stability and hydrolytic resistance can be obtained. The present invention has been accomplished based on this finding.

That is, the present invention is a composition which comprises (i) polylactide, (ii) a metal catalyst and (iii) a hypophosphorous acid-based deactivator or a metaphosphoric acid-based deactivator.

The present invention includes a molded product of the composition.

Further, the present invention is a process for manufacturing a composition containing stereocomplex crystal by mixing together poly-L-lactide and poly-D-lactide, wherein at least one of poly-L-lactide and poly-D-lactide contains a metal catalyst and the mixing is carried out in the presence of a hypophosphorous acid-based deactivator or metaphosphoric acid-based deactivator.

DETAILED DESCRIPTION OF THE PREFERRED EMBODIMENT

The present invention will be described in detail hereinunder.

<Composition>

Polylactide is essentially composed of a lactide unit represented by the following formula. Polylactide contains a lactide unit represented by the following formula in an amount of preferably 90 to 100 mol %, more preferably 95 to 100 mol %, much more preferably 98 to 100 mol %.

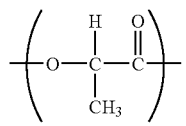

The weight average molecular weight (Mw) of polylactide is preferably 100,000 to 500,000, more preferably 150,000 to 350,000. The weight average molecular weight in this text is a weight average molecular weight value in terms of standard polystyrene measured by gel permeation chromatography (GPC) using chloroform as an eluent.

Polylactide is preferably poly-L-lactide, poly-D-lactide or a mixture of both. The weight ratio of poly-L-lactide to poly-D-lactide is preferably 90:10 to 10:90, more preferably 75:25 to 25:75, much more preferably 60:40 to 40:60.

Poly-L-lactide contains an L-lactide unit as the major component. Poly-L-lactide contains an L-lactide unit in an amount of preferably 90 to 100 mol %, more preferably 95 to 100 mol %, much more preferably 98 to 100 mol %. The other units are a D-lactide unit and a unit other than lactide. The total amount of the D-lactide unit and the unit other than lactide is 0 to 10 mol %, preferably 0 to 5 mol %, more preferably 0 to 2 mol %.

Poly-D-lactide contains a D-lactide unit as the major component. Poly-D-lactide contains a D-lactide unit in an amount of preferably 90 to 100 mol %, more preferably 95 to 100 mol %, much more preferably 98 to 100 mol %. The other units are an L-lactide unit and a unit other than lactide. The total amount of the L-lactide unit and the unit other than lactide is 0 to 10 mol %, preferably 0 to 5 mol %, more preferably 0 to 2 mol %.

The unit other than lactide is a unit derived from a dicarboxylic acid, polyhydric alcohol, hydroxycarboxylic acid or lactone having a functional group capable of forming two or more ester bonds, or a unit derived from a polyester, polyether or polycarbonate which comprises the above constituent components.

Examples of the dicarboxylic acid include succinic acid, adipic acid, azelaic acid, sebacic acid, terephthalic acid and isophthalic acid. Examples of the polyhydric alcohol include aliphatic polyhydric alcohols such as ethylene glycol, propylene glycol, butanediol, pentanediol, hexanediol, octanediol, glycerin, sorbitan, neopentyl glycol, diethylene glycol, triethylene glycol, polyethylene glycol and polypropylene glycol, and aromatic polyhydric alcohols such as adduct of bisphenol with ethylene oxide. Examples of the hydroxycarboxylic acid include glycolic acid and hydroxybutyric acid. Examples of the lactone include glycolide, ε-caprolactone glycolide, ε-caprolactone, β-propiolactone, δ-butyrolactone, β- or γ-butyrolactone, pivalolactone and δ-valerolactone.

Poly-L-lactide and poly-D-lactide can be manufactured by known methods. For example, they can be manufactured by heating L- or D-lactide in the presence of a metal catalyst to ring-opening polymerize it. Alternatively, they can be manufactured by crystallizing low molecular weight polylactide containing a metal catalyst and heating it under reduced pressure or in a inert gas stream to solid-phase polymerize it. Further, they can be manufactured by a direct polymerization method in which lactide is dehydrated and condensed in the presence or absence of an organic solvent.

The polymerization reaction can be carried out in a conventionally known reactor. For example, vertical reactors having high-viscosity agitating elements such as helical ribbon elements can be used alone or in combination.

An alcohol may be used as a polymerization initiator. Preferably, the alcohol does not impede the polymerization of polylactide and is non-volatile. Preferred examples of the alcohol include decanol, dodecanol, tetradecanol, hexadecanol and octadecanol.

In the solid-phase polymerization method, a lactide polyester having a relatively low molecular weight obtained by the above ring-opening polymerization or the direct polymerization of lactide is used as a prepolymer. It is preferred from the viewpoint of preventing fusion that the prepolymer should be crystallized at a temperature range of its glass transition temperature (Tg) or higher and lower than its melting point (Tm) in advance. The crystallized prepolymer is filled into a fixed vertical reactor or a reactor whose vessel turns, such as a tumbler or kiln and heated at a temperature of the glass transition temperature (Tg) of the prepolymer or higher and lower than the melting point (Tm). If the polymerization temperature is raised stepwise along with the proceeding of polymerization, there will be no problem. It is also preferred that the inside pressure of the above reactor should be reduced to remove water generated during solid-phase polymerization efficiently or that a heated inert gas stream should be circulated.

(Stereocomplex Polylactide)

Polylactide is preferably so-called "stereocomplex polylactide" which is a mixture of poly-L-lactide and poly-D-lactide and contains stereocomplex crystal. The stereocomplex crystal is formed by mixing together poly-L-lactide and poly-D-lactide. In this case, the weight ratio of poly-L-lactide to poly-D-lactide is preferably 90:10 to 10:90, more preferably 75:25 to 25:75, much more preferably 60:40 to 40:60. The weight average molecular weights (Mw) of poly-L-lactide and poly-D-lactide are each preferably 100,000 to 500,000, more preferably 150,000 to 350,000.

The stereocomplex crystal content (X) of the composition of the present invention is preferably 80 to 100%, more preferably 95 to 100%. The stereocomplex crystal content (X) is represented by the following equation.

$$X = \{\Delta HB/(\Delta HA + \Delta HB)\} \times 100(\%)$$

In the above equation, $\Delta HB$ is the fusion enthalpy of a crystal melting point which appears at 150° C. or higher and lower than 190° C., and $\Delta HB$ is the fusion enthalpy of a crystal melting point which appears at 190° C. or higher and lower than 250° C.

The stereocomplex polylactide as used in the present invention has fusion peaks at 195° C. or higher which account for preferably 80% or more, more preferably 90% or more, much more preferably 95% or more of the total of all the fusion peaks during temperature elevation when measured by a differential scanning calorimeter (DSC). The melting point of the stereocomplex polylactide is in the range of preferably 195 to 250° C., more preferably 200 to 220° C. The fusion enthalpy is 20 J/g or more, preferably 30 J/g or more. More specifically, it is preferred that fusion peaks at 195° C. or higher should account for 90% or more of the total of all the fusion peaks during temperature elevation when measured by a differential scanning calorimeter (DSC), the melting point should be in the range of 195 to 250° C., and the fusion enthalpy should be 20 J/g or more.

The stereocomplex crystal can be manufactured by mixing together poly-L-lactide and poly-D-lactide in a predetermined weight ratio.

The above mixing can be carried out in the presence of a solvent. The mixing may be carried out in the absence of a solvent. That is, poly-L-lactide and poly-D-lactide are mixed together in a predetermined ratio and melt kneaded together, or one of them is molten and the other is added to and kneaded with the molten product.

(Metal Catalyst)

The metal catalyst used for the manufacture of poly-L-lactide or poly-D-lactide is preferably a compound of at least one metal selected from the group consisting of an alkali earth metal, a rare earth element, a transition metal of the fourth period, aluminum, germanium, tin and antimony. Examples of the alkali earth metal include magnesium, calcium and strontium. Examples of the rare earth element include scandium, yttrium, lanthanum and cerium. Examples of the transition metal of the fourth period include titanium, iron, cobalt, nickel and zinc.

The metal catalyst is preferably a carboxylate, alkoxide, halide, oxide, carbonate, enolate salt or trifluoromethane sulfonate of the above metal. When polymerization activity and the color of the obtained composition are taken into consideration, tin octylate, zinc nitrate, titanium tetraisopropoxide and aluminum triisopropoxide are particularly preferred.

The composition of the present invention comprises polylactide which is polymerized in the presence of the above metal catalyst. Therefore, the composition of the present invention contains the metal catalyst in an amount of 0.001 to 1 part by weight, preferably 0.005 to 0.1 part by weight based on 100 parts by weight of polylactide. When the amount of the metal catalyst is too small, the polymerization rate becomes too low disadvantageously. When the amount is too large, coloring caused by reaction heat, depolymerization or an ester interchange reaction is accelerated, thereby deteriorating the color and heat stability of the obtained composition.

(Hypophosphorous Acid-Based Deactivator)

The hypophosphorous acid-based deactivator is a compound having the ability of forming a salt or complex with the metal catalyst. Two hydrogen atoms showing strong reduction power are bonded to the phosphorus atom of the hydrophosphorous acid-based deactivator, thereby making it possible to suppress an increase in the amount of a radical or oxide produced at a high temperature. The hypophosphorous acid-based deactivator is preferably at least one selected from the group consisting of hypophosphorous acid, an alkali metal salt of hypophosphorous acid, an alkali earth metal salt of hypophosphorous acid and an onium salt of hypophosphorous acid.

Examples of the alkali metal salt of hypophosphorous acid include sodium salts and potassium salts of hypophosphorous acid. Examples of the alkali earth metal salt of hypophosphorous acid include calcium salts and magnesium salts of hypophosphorous acid. Examples of the onium salt of hypophosphorous acid include tetraethylammonium hypophosphite, tetra-n-butylammonium hypophosphite, tetraethylphosphonium hypophosphite and tetra-n-butylphosphonium hypophosphite. The hypophosphorous acid-based deactivator is preferably hypophosphorous acid, sodium hypophosphite, potassium hypophosphite, magnesium hypophosphite, calcium hypophosphite and ammonium hypophosphite. Hypophosphorous acid is particularly preferred from the viewpoints of the deactivation power of the metal catalyst and the suppression of an oxide.

The content of the hypophosphorous acid-based deactivator is 0.001 to 5 parts by weight, preferably 0.01 to 0.5 part by weight based on 100 parts by weight of polylactide. When the content of the hypophosphorous acid-based deactivator is too low, its reaction efficiency with the residual polymerization catalyst becomes too low, thereby causing the nonuniform deactivation of the polymerization catalyst. When the content is too high, the plasticization of the composition caused by the hypophosphorous acid-based deactivator or a reduction in hydrolytic resistance caused by an increase in water absorptivity becomes marked.

The hypophosphorous acid-based deactivator can be directly added to and kneaded in a reactor in the latter stage of polymerization in the ring-opening polymerization method. It may be kneaded by means of an extruder or kneader after it is molded into a chip. When the uniform distribution of the hypophosphorous acid-based deactivator in polylactide is taken into consideration, the use of an extruder or kneader is preferred. It is also preferred that the discharge unit of the reactor should be directly connected to the extruder to add the hypophosphorous acid-based deactivator from a side feeder. To add the hypophosphorous acid-based deactivator by the above method, it is preferred that an aqueous solution of the deactivator or a solution of the deactivator dissolved in a polar organic solvent such as an alcohol or tetrahydrofuran should be added.

In the solid-phase polymerization method, it is possible to knead solid polylactide obtained at the end of polymerization with the hypophosphorous acid-based deactivator by means of an extruder or kneader or to knead solid polylactide with a mater batch containing the hypophosphorous acid-based deactivator by means of an extruder or kneader.

Since a high temperature of 180° C. or higher is required to produce stereocomplex poly-L-lactide and poly-D-lactide, the hypophosphorous acid-based deactivator is preferably added by any one of the above methods before the production of the stereocomplex poly-L-lactide and poly-D-lactide.

(Metaphosphoric Acid-Based Deactivator)

The metaphosphoric acid-based deactivator used in the present invention is a compound obtained by condensing 3 to 200 phosphoric acid units in a loop and has the ability of forming a complex with a metal catalyst or water. The metaphosphoric acid-based deactivator is a cyclic multidentate ligand, has a larger complex stability constant than phosphoric acid, phosphorous acid, pyrophosphoric acid, polyphosphoric acid and esters thereof which are monodendate or chain multidendate ligands, and can capture a metal catalyst and water efficiently and firmly. The metaphosphoric acid-based deactivator is preferably at least one selected from the group consisting of metaphosphoric acid, an alkali metal salt of metaphosphoric acid, an alkali earth metal salt of metaphosphoric acid and an onium salt of metaphosphoric acid. Examples of the alkali metal salt of metaphosphoric acid include sodium salts and potassium salts of metaphosphoric acid. Examples of the alkali earth metal salt of metaphosphoric acid include calcium salts and magnesium salts of metaphosphoric acid. Examples of the onium salt of metaphosphoric acid include tetraethylammonium metaphosphate, tetra-n-butylammonium metaphosphate, tetraethylphosphonium metaphosphate and tetra-n-butylphosphonium metaphosphate.

The metaphosphoric acid-based deactivator is preferably at least one selected from the group consisting of a compound represented by the following formula, and an alkali metal salt, an alkali earth metal salt and an onium salt thereof.

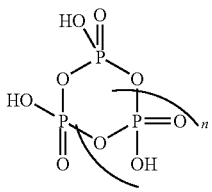

wherein n is an integer of 1 to 200.

The compound represented by the above formula is generally a mixture of compounds of the formula in which n is an integer of 1 to 200. In the above formula, n is an integer of preferably 1 to 100, more preferably 1 to 50, much more preferably 1 to 12.

When the ability of deactivating the metal catalyst and water, compatibility with polylactide and handling ease are taken into consideration, metaphosphoric acid or a sodium salt thereof having a pH of an aqueous solution prepared by dissolving 1 g thereof in 100 ml of water of 6 or less, preferably 4 or less, more preferably 2 or less is preferred.

The metaphosphoric acid-based deactivator must have a P(=O)OH position for capturing the metal catalyst contained in polylactide. The index indicating this clearly is the pH of an aqueous solution prepared by dissolving 1 g of the metaphosphoric acid-based deactivator in 100 ml of water. The above pH is preferably 6 or less in order to have the P(=O)OH position existent sufficiently. When the above pH is higher than 6, the metaphosphoric acid-based deactivator cannot deactivate the metal catalyst completely, or it takes long to deactivate the metal catalyst and it is impossible to suppress the thermal decomposition of polylactide. The content of the metaphosphoric acid-based deactivator is 0.001 to 10 parts by weight, preferably 0.01 to 0.5 part by weight based on 100 parts by weight of polylactide. When the content of the metaphosphoric acid-based deactivator is too low, the deactivation efficiency of the residual metal catalyst becomes too low and deactivation becomes nonuniform. When the content is too high, the plasticization of the composition caused by the metaphosphoric acid-based deactivator or a reduction in long-term hydrolytic resistance caused by an increase in water absorptivity after molding becomes marked.

Metaphosphoric acid-based deactivators have a glass transition temperature of 130 to 150° C., which slightly differs according to preparation process. Since a metaphosphoric acid-based deactivator having a glass transition temperature of 100° C. or higher can be easily dried by heating in a solid state, it can be directly added to and kneaded in a reactor in the latter stage of polymerization in the ring-opening polymerization method advantageously. It can be kneaded by means of an extruder or kneader as a master batch molded into a chip. When the uniform distribution of the metaphosphoric acid-based deactivator in polylactide is taken into consideration, the use of an extruder or kneader is preferred. It is also preferred that the discharge unit of the reactor should be directly connected to the extruder to add the metaphosphoric acid-based deactivator from a side feeder as an aqueous solution or a polar organic solvent solution. Preferred examples of the polar organic solvent include ethers such as dimethoxyethane and tetrahydrofuran, and alcohols such as methanol and ethanol. In the solid-phase polymerization method, it is possible to knead solid polylactide obtained at the end of polymerization with the metaphosphoric acid-based deactivator by means of an extruder or kneader or to knead solid polylactide with a master batch containing the metaphosphoric acid-based deactivator by means of an extruder or kneader.

Out of metaphosphoric acids, sodium metaphosphate is preferred because its safety as a food additive is established. Sodium metaphosphate has such advantages that it is solid at normal temperature, does not need to be added in an aqueous solution form to polylactide and eliminates the use of water for promoting hydrolysis. Sodium metaphosphate has a lower melting point than that of polylactide. Therefore, even when it is added in a solid state to polylactide, it melts at a lower temperature than polylactide and can be easily dispersed in polylactide. Sodium metaphosphate has lower acidity than strong acidic metaphosphoric acid and prevents the corrosion of an apparatus.

The composition of the present invention has a weight average molecular weight (Mw) of 100,000 to 500,000, preferably 150,000 to 350,000, is excellent in heat stability, color and hydrolytic resistance and can be advantageously used for melt spinning, melt film formation and injection molding.

<Composition Manufacturing Process>

The present invention is a process for manufacturing a composition containing stereocomplex crystal by mixing together poly-L-lactide and poly-D-lactide, wherein at least one of poly-L-lactide and poly-D-lactide contains a metal catalyst and the mixing is carried out in the presence of a hypophosphorous acid-based deactivator or a metaphosphoric acid-based deactivator.

The poly-L-lactide, poly-D-lactide, metal catalyst, hypophosphorous acid-based deactivator and metaphosphoric acid-based deactivator have been described in the section of the composition.

Therefore, the metal catalyst is preferably a compound containing at least one metal selected from the group consisting of an alkali earth metal, a rare earth metal, a transition metal of the third period, aluminum, germanium, tin and antimony.

The content of the metal catalyst is preferably 0.001 to 1 part by weight based on 100 parts by weigh of the total of poly-L-lactide and poly-D-lactide.

The hypophosphorous acid-based deactivator is preferably at least one selected from the group consisting of hypophosphorous acid, an alkali metal salt of hypophosphorous acid, an alkali earth metal salt of hypophosphorous acid and an onium salt of hypophosphorous acid.

The hypophosphorous acid-based deactivator is preferably contained in an amount of 0.001 to 5 parts by weight based on 100 parts by weight of the total of poly-L-lactide and poly-D-lactide.

The metaphosphoric acid-based deactivator is preferably at least one selected from the group consisting of a compound represented by the following formula, and an alkali metal salt, an alkali earth metal salt and an onium salt thereof.

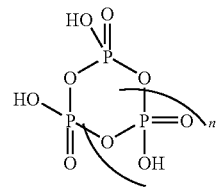

wherein n is an integer of 1 to 200.

The metaphosphoric acid-based deactivator preferably has a pH of an aqueous solution prepared by dissolving 1 g thereof in 100 ml of water of 6 or less.

The metaphosphoric acid-based deactivator is preferably contained in an amount of 0.001 to 10 parts by weight based on 100 parts by weight of the total of poly-L-lactide and poly-D-lactide.

The above mixing may be carried out in the presence of a solvent. The solvent is not particularly limited if it can dissolve poly-L-lactide and poly-D-lactide. Examples of the solvent include chloroform, methylene chloride, dichloroethane, tetrachloroethane, phenol, tetrahydrofuran, N-methylpyrrolidone, N,N-dimethylformamide, butyrolactone, trioxan and hexafluoroisopropanol. They may be used alone or in combination of two or more. The mixing may be carried out in the absence of a solvent. That is, poly-L-lactide and poly-D-lactide are mixed together in a predetermined ratio and melt kneaded together, or one of them is molten and the other is added to and kneaded with the molten product.

In the above process, the following poly-L-lactide and poly-D-lactide are mixed together. The alphabets below indicate the following.

(L) poly-L-lactide containing substantially no metal catalyst
(Lc) poly-L-lactide containing a metal catalyst
(Lcp) poly-L-lactide containing a metal catalyst and a hypophosphorous acid-based deactivator or metaphosphoric acid-based deactivator
(D) poly-D-lactide containing substantially no metal catalyst
(Dc) poly-D-lactide containing a metal catalyst
(Dcp) poly-D-lactide containing a metal catalyst and a hypophosphorous acid-based deactivator or metaphosphoric acid-based deactivator
(P) hypophosphorous acid-based deactivator or metaphosphoric acid-based deactivator
mode 1: mixing together (L) and (Dcp)
mode 2: mixing together (L), (Dc) and (P)
mode 3: mixing together (Lc), (D) and (P)
mode 4: mixing together (Lc), (Dc) and (P)
mode 5: mixing together (Lc) and (Dcp)
mode 6: mixing together (Lcp) and (D)
mode 7: mixing together (Lcp) and (Dc)
mode 8: mixing together (Lcp) and (Dcp)

The above process is preferably a process for manufacturing a polylactide composition by mixing together (i) a composition prepared by adding a hypophosphorous acid-based deactivator or a metaphosphoric acid-based deactivator to poly-L-lactide manufactured in the presence of a metal catalyst and (ii) a composition prepared by adding a hypophosphorous acid-based deactivator or a metaphosphoric acid-based deactivator to poly-D-lactide manufactured in the presence of a metal catalyst. The above mixing may be carried out in the presence of a solvent. Alternatively, the mixing may be carried out by melt kneading in the absence of a solvent.

<Molded Product>

The present invention includes a molded product of the above-described composition. That is, injection molded articles, extrusion molded articles, vacuum compression molded articles, blow molded articles, films, sheet nonwoven fabrics, fibers, cloth, composites with other material, agricultural materials, fishing materials, civil engineering and construction materials, stationery, medical supplies and other molded products can be obtained from the composition of the present invention. Molding can be carried out in accordance with a common used method.

EXAMPLES

The following examples and comparative examples are provided for the purpose of further illustrating the present invention but are in no way to be taken as limiting. The evaluation of physical properties were made by the following methods.

(1) Heat Stability Test on Composition 10 g of the composition was fed to a Pyrex (registered trademark) test tube with a cock, and the tube whose inside had been substituted by nitrogen was maintained at 260° C. for 10 minutes to evaluate the heat stability of the composition. The weight average molecular weights before and after the test of the composition were measured by GPC and compared with each other to evaluate the heat stability.

The amounts (unit: eg/t) of the terminal carboxyl group of the composition before and after the heat stability test were compared with each other to evaluate the hydrolytic resistance of the composition. An increase in the amount of the terminal carboxyl group is an index of the degree of hydrolysis. The amount of the terminal carboxyl group was obtained by dissolving 100 mg of a sample in 10 ml of chloroform, adding 10 ml of ethanol to the resulting solution, adding BTB as an indicator to the solution and titrating with a 0.05 N potassium hydroxide/ethanol solution.

(2) Weight Average Molecular Weight (Mw)

50 mg of the sample was dissolved in 5 ml of chloroform, and chloroform heated at 40° C. was used as a carrier to obtain the weight average molecular weight (Mw) of the sample by using the GPC-11 of Showdex Co., Ltd. The weight average molecular weight (mw) was calculated as a value in terms of polystyrene.

(3) Lactide Content of Composition

The lactide content of the composition was calculated as the area ratio (4.98 to 5.05 ppm) of a quartet peak derived from lactide based on the area ratio (5.10 to 5.20 ppm) of a quartet peak derived from polylactide measured in deuterium-substituted chloroform by using the JNM-EX270 nuclear magnetic resonance spectrometer of JEOL Ltd.

(4) Method of Calculating Stereocomplex Crystal Content (X)

The stereocomplex crystal content (X) was calculated based on the following equation from the fusion enthalpy $\Delta HA$ of a crystal melting point which appears at 150° C. or higher and lower than 190° C. and the fusion enthalpy $\Delta HB$ of a crystal melting point which appears at 190° C. or higher and lower than 250° C. when measured by a differential scanning calorimeter (DSC).

$$X = \{\Delta HB / (\Delta HA + \Delta HB)\} \times 100 (\%)$$

(5) Evaluation of Color of Composition

The evaluation of the color of the composition was made based on L, a and b values obtained by the UV2400PC ultraviolet-visible spectrometer of Shimadzu Corporation. The evaluated sample was a 40 nm-thick film which was formed from a 15 wt % dichloromethane solution of the composition as a stock solution by a solvent casting method.

(5) Used Lactide

Polymerization-grade L-lactide manufactured by Musashino Kagaku Kenkyuusho Co., Ltd. and polymerization-grade D-lactide manufactured by Musashino Kagaku Kenkyuusho Co., Ltd. were used in the following examples.

Example 1

Polylactide+Hypophosphorous Acid 100 parts by weight of L-lactide and 0.15 part by weight of stearyl alcohol were fed from the material feed port of a polymerization reactor equipped with a cooling distillation tube in a nitrogen stream. Subsequently, the inside of the reactor was substituted by nitrogen 5 times and L-lactide was molten at 190° C. When L-lactide was completely molten, 0.05 part by weight of tin 2-ethylhexanoate was added from the material feed port together with 500 µl of toluene to carry out polymerization at 190° C. for 1 hour.

After the end of polymerization, 0.02 part by weight of hypophosphorous acid (manufactured by Wako Pure Chemical Industries, Ltd.) was added from the material feed port and kneaded for 15 minutes. Finally, surplus L-lactide was volatilized and a strand-like poly-L-lactide composition was discharged from the discharge port of the reactor and pelletized while it was cooled. The Mw and lactide content of the obtained composition are shown in Table 1.

The obtained composition was ground with a grinder, and 10 g of the grains was fed to a test tube with a cock made of the Pyrex (registered trademark of Corning Co., Ltd.) heat resistant glass. Thereafter, the inside of the Pyrex (registered trademark) test tube was substituted by nitrogen to carry out a heat stability test at 260° C. for 10 minutes. After the end of the test, the composition was taken out to measure its Mw and lactide content. The measurement results are shown in Table 1. The L, a and b values of the composition at this point are shown in Table 2.

Comparative Example 1

A composition was obtained in the same manner as in Example 1 except that hypophosphorous acid was not added. When a heat stability test was made on this composition, the composition after the heat stability test was fragile, and lactide crystal which was a decomposed product adhered to the Pyrex (registered trademark) test tube used in the test. The Mw and lactide content of the composition after the heat stability test are shown in Table 1. The L, a and b values of the composition at this point are shown in Table 2.

TABLE 1

|  |  | Mw | Lactide content (%) |
|---|---|---|---|
| Example 1 | Before heat stability test | $21.1 \times 10^4$ | 4.1 |
|  | After heat stability test | $19.6 \times 10^4$ | 4.4 |
| Comparative Example 1 | Before heat stability test | $20.9 \times 10^4$ | 5.9 |
|  | After heat stability test | $12.6 \times 10^4$ | 9.2 |

TABLE 2

|  | L | a | b |
|---|---|---|---|
| Example 1 | 93.6 | 0.03 | 1.23 |
| Comparative Example 1 | 93.2 | −0.04 | 3.22 |

Example 2

Stereocomplex Polylactide+Hypophosphorous Acid (Manufacture of Poly-L-Lactide)

100 parts by weight of L-lactide and 0.15 part by weight of stearyl alcohol were fed from the material feed port of a polymerization reactor equipped with a cooling distillation tube in a nitrogen stream. Subsequently, the inside of the reactor was substituted by nitrogen 5 times, and L-lactide was molten at 190° C. When L-lactide was completely molten, 0.05 part by weight of tin 2-ethylhexanoate was added from the material feed port together with 500 µl of toluene to carry out polymerization at 190° C. for 1 hour.

After the end of polymerization, 0.02 part by weight of hypophosphorous acid (manufactured by Wako Pure Chemical Industries, Ltd.) was added from the material feed port and kneaded for 15 minutes. Finally, surplus L-lactide was volatilized and strand-like poly-L-lactide was discharged from the discharge port of the reactor and pelletized while it was cooled.

(Manufacture of Poly-D-Lactide)

Poly-D-lactide was prepared by the same operation as above. That is, 100 parts by weight of D-lactide and 0.15 part by weight of stearyl alcohol were fed, the inside of the reactor was substituted by nitrogen 5 times, and D-lactide was molten at 190° C. When D-lactide was completely molten, 0.05 part by weight of tin 2-ethylhexanoate was added from the material feed port together with 500 µl of toluene to carry out polymerization at 190° C. for 1 hour. After the end of polymerization, 0.02 part by weight of hypophosphorous acid (manufactured by Wako Pure Chemical Industries, Ltd., phosphinic acid) was added from the material feed port and kneaded for 15 minutes. Finally, surplus D-lactide was volatilized and strand-like poly-D-lactide was discharged from the discharge port of the reactor and pelletized while it was cooled.

(Formation of Stereocomplex)

50 parts by weight of the above poly-L-lactide pellet and 50 parts by weight of the above poly-D-lactide pellet were mixed together well and kneaded together at 230° C. in a nitrogen stream for 10 minutes by using the 50C150 Labo Plastomill kneader of Toyo Seiki Co., Ltd. The stereocomplex crystal content (X) of the obtained composition was 98.8%.

(Heat Stability Test)

The obtained composition was ground with a grinder, and 10 g of the grains was fed to a Pyrex (registered trademark) test tube with a cock. Thereafter, the inside of the Pyrex (registered trademark) test tube was substituted by nitrogen to carry out a heat stability test at 260° C. for 10 minutes. After the end of the test, the composition was taken out to measure its Mw and lactide content. The measurement results are shown in Table 3. The L, a and b values of the composition at this point are shown in Table 4.

Example 3

Stereocomplex Polylactide+Ammonium Hypophosphite

A composition was obtained in the same manner as in Example 2 except that 0.02 part by weight of ammonium hypophosphite (of MP Biomedicals) was used as the hypophosphorous acid-based deactivator. The stereocomplex crystal content of the obtained composition was 99.0%. The Mw and lactide content of the composition before and after the heat stability test are shown in Table 3 and the L, a and b values of the composition are shown in Table 4.

Comparative Example 2

A composition was obtained in the same manner as in Example 2 except that the hypophosphorous acid-based deactivator was not added. When a heat stability test was made on this composition, the composition after the heat stability test was fragile and assumed brown, and lactide crystal which was a decomposed product adhered to the Pyrex (registered trademark) test tube used in the test. The Mw and lactide content of the composition before and after the heat stability test are shown in Table 3 and the L, a and b values are shown in Table 4.

TABLE 3

|  |  | Mw | Lactide content (%) |
|---|---|---|---|
| Example 2 | Before heat stability test | $23.5 \times 10^4$ | 3.3 |
|  | After heat stability test | $21.7 \times 10^4$ | 4.2 |
| Example 3 | Before heat stability test | $23.2 \times 10^4$ | 3.0 |
|  | After heat stability test | $20.5 \times 10^4$ | 4.8 |
| Comparative Example 2 | Before heat stability test | $20.2 \times 10^4$ | 5.6 |
|  | After heat stability test | $13.3 \times 10^4$ | 6.8 |

TABLE 4

|  | L | a | b |
|---|---|---|---|
| Example 2 | 94.1 | 0.01 | 1.31 |
| Example 3 | 93.8 | 0.02 | 1.08 |
| Comparative Example 2 | 93.7 | −0.02 | 3.48 |

Example 4

Polylactide+Metaphosphoric Acid 100 parts by weight of L-lactide and 0.15 part by weight of stearyl alcohol were fed from the material feed port of a polymerization reactor equipped with a cooling distillation tube in a nitrogen stream. Subsequently, the inside of the reactor was substituted by nitrogen 5 times, and L-lactide was molten at 190° C. When L-lactide was completely molten, 0.05 part by weight of tin 2-ethylhexanoate was added from the material feed port together with 500 µl of toluene to carry out polymerization at 190° C. for 1 hour. After the end of polymerization, 0.02 part by weight of metaphosphoric acid (manufactured by Wako Pure Chemical Industries, Ltd.) having a pH of an aqueous solution prepared by dissolving 1 g thereof in 100 ml of water of 0.85 was added from the material feed port and kneaded for 15 minutes. Finally, surplus L-lactide was volatilized and a composition was discharged from the reactor. The Mw, lactide content and terminal carboxyl group amount of the obtained composition are shown in Table 5.

The obtained composition was ground with a grinder to obtain grains as large as 2 to 5 mm, and 10 g of the grains was fed to a Pyrex (registered trademark) test tube with a cock. Thereafter, the inside of the Pyrex (registered trademark) test tube was substituted by nitrogen to carry out a heat stability test at 260° C. for 10 minutes and 60 minutes. After the end of the test, the composition was taken out to measure its Mw, lactide content and terminal carboxyl group amount. The measurement results are shown in Table 5.

Example 5

Polylactide+Sodium Metaphosphate

A composition was prepared in the same manner as in Example 4 except that 0.02 part by weight of sodium metaphosphate (manufactured by Rasa Shouei Co., Ltd., acidic metaphosphoric acid, polymerization degree of 1 to 34) having a pH of an aqueous solution prepared by dissolving 1 g thereof in 100 ml of water of 1.97 was used in place of 0.02 part by weight of metaphosphoric acid. The Mw, lactide content and terminal carboxyl group amount of the obtained composition are shown in Table 5. The obtained composition was ground with a grinder to obtain grains as large as 2 to 5 mm, and 10 g of the grains was fed to a Pyrex (registered trademark) test tube with a cock. Thereafter, the inside of the Pyrex (registered trademark) test tube was substituted by nitrogen to carry out a heat stability test at 260° C. for 10 minutes and 60 minutes. After the end of the test, the composition was taken out to measure its Mw, lactide content and terminal carboxyl group amount. The measurement results are shown in Table 5.

Example 6

Polylactide+Sodium Metaphosphate

A composition was prepared in the same manner as in Example 4 except that 0.02 part by weight of sodium metaphosphate having a pH of an aqueous solution prepared by dissolving 1 g thereof in 100 ml of water of 4.0 was used in place of 0.02 part by weight of metaphosphoric acid. The sodium metaphosphate was prepared by partially neutralized metaphosphoric acid used in Example 4 with sodium hydroxide and drying it. The Mw and lactide content of the obtained composition are shown in Table 5. The obtained composition was ground with a grinder to obtain grains as large as 2 to 5 mm, and 10 g of the grains was fed to a Pyrex (registered trademark) test tube with a cock. Thereafter, the inside of the Pyrex (registered trademark) test tube was substituted by nitrogen to carry out a heat stability test at 260° C. for 10 minutes and 60 minutes. After the end of the test, the composition was taken out to measure its Mw and lactide content. The measurement results are shown in Table 5.

Example 7

Polylactide+Sodium Metaphosphate

A composition was prepared in the same manner as in Example 4 except that 0.02 part by weight of sodium metaphosphate having a pH of an aqueous solution prepared by dissolving 1 g thereof in 100 ml of water of 5.6 was used in place of 0.02 part by weight of metaphosphoric acid. The sodium metaphosphate was obtained by partially neutralized metaphosphoric acid used in Example 4 with sodium hydroxide and drying it. The Mw and lactide content of the obtained composition are shown in Table 5. The obtained composition was ground with a grinder to obtain grains as large as 2 to 5 mm, and 10 g of the grains was fed to a Pyrex (registered trademark) test tube with a cock. Thereafter, the inside of the Pyrex (registered trademark) test tube was substituted by nitrogen to carry out a heat stability test at 260° C. for 10 minutes and 60 minutes. After the end of the test, the composition was taken out to measure its Mw and lactide content. The measurement results are shown in Table 5.

Comparative Example 3

A composition was obtained in the same manner as in Example 4 except that metaphosphoric acid was not added. A heat stability test was carried out on this composition in the same manner as in Example 4. The Mw, lactide content and terminal carboxyl group amount of the obtained composition after the heat stability test are shown in Table 5.

TABLE 5

| | | Mw | Lactide content (%) | amount of terminal carboxyl group (eq/t) |
|---|---|---|---|---|
| Comparative Example 3 | Before heat stability test | $20.9 \times 10^4$ | 5.9 | 3.7 |
| | 10 minutes after heat stability test | $12.6 \times 10^4$ | 9.2 | 44.8 |
| | 60 minutes after heat stability test | — | — | 158.3 |
| Example 4 | Before heat stability test | $25.1 \times 10^4$ | 2.7 | 10.9 |
| | 10 minutes after heat stability test | $23.3 \times 10^4$ | 3.1 | 15.4 |
| | 60 minutes after heat stability test | $12.5 \times 10^4$ | 3.9 | 55.8 |
| Example 5 | Before heat stability test | $24.7 \times 10^4$ | 2.9 | 12.5 |
| | 10 minutes after heat stability test | $23.6 \times 10^4$ | 3.1 | 15.7 |
| | 60 minutes after heat stability test | $11.8 \times 10^4$ | 3.5 | 47.8 |
| Example 6 | Before heat stability test | $22.3 \times 10^4$ | 3.4 | — |
| | 10 minutes after heat stability test | $20.0 \times 10^4$ | 3.4 | — |
| | 60 minutes after heat stability test | $11.5 \times 10^4$ | 4.2 | — |
| Example 7 | Before heat stability test | $22.9 \times 10^4$ | 3.1 | — |
| | 10 minutes after heat stability test | $19.8 \times 10^4$ | 3.2 | — |
| | 60 minutes after heat stability test | $10.8 \times 10^4$ | 4.0 | — |

Example 8

Stereocomplex Polylactide+Metaphosphoric Acid (Manufacture of Poly-L-Lactide)

100 parts by weight of L-lactide and 0.15 part by weight of stearyl alcohol were fed from the material feed port of a polymerization reactor equipped with a cooling distillation tube in a nitrogen stream. Subsequently, the inside of the reactor was substituted by nitrogen 5 times, and L-lactide was molten at 190° C. When L-lactide was completely molten, 0.05 part by weight of tin 2-ethylhexanoate was added from the material feed port together with 500 µl of toluene to carry out polymerization at 190° C. for 1 hour.

After the end of polymerization, 0.02 part by weight of metaphosphoric acid having a pH of an aqueous solution prepared by dissolving 1 g thereof in 100 ml of water of 0.85 was added from a catalyst injection port and kneaded for 15 minutes. Finally, surplus L-lactide was volatilized and strand-like poly-L-lactide was discharged from the discharge port of the reactor and pelletized while it was cooled.

(Manufacture of Poly-D-Lactide)

Poly-D-lactide was prepared by the same operation as above. That is, 100 parts by weight of D-lactide and 0.15 part by weight of stearyl alcohol were fed to the reactor, the inside of the reactor was substituted by nitrogen 5 times, and D-lactide was molten at 190° C. When D-lactide was completely molten, 0.05 part by weight of tin 2-ethylhexanoate was added from the material feed port together with 500 µl of toluene to carry out polymerization at 190° C. for 1 hour.

After the end of polymerization, 0.02 part by weight of metaphosphoric acid (manufactured by Wako Pure Chemical Industries, Ltd.) having a pH of an aqueous solution prepared by dissolving 1 g thereof in 100 ml of water of 0.85 was added from the catalyst injection port and kneaded for 15 minutes. Finally, surplus D-lactide was volatilized and strand-like poly-D-lactide was discharged from the discharge port of the reactor and pelletized while it was cooled.

(Formation of Stereocomplex)

50 parts by weight of the above poly-L-lactide pellet and 50 parts by weight of the above poly-D-lactide pellet were mixed together well and kneaded together at 230° C. in a nitrogen stream for 10 minutes by using the 50C150 Labo Plastomill kneader of Toyo Seiki Co., Ltd. The stereocomplex crystal content (X) of the obtained composition was 99.7%. The Mw and lactide content of the obtained composition are shown in Table 6.

The obtained composition was ground with a grinder to obtain grains as large as 2 to 5 mm, and 10 g of the grains was fed to a Pyrex (registered trademark) test tube with a cock. Thereafter, the inside of the Pyrex (registered trademark) test tube was substituted by nitrogen to carry out a heat stability test at 260° C. for 10 minutes. After the end of the test, the composition was taken out to measure its Mw and lactide content. The measurement results are shown in Table 6.

Example 9

Stereocomplex Polylactide+Sodium Metaphosphate

A composition was prepared in the same manner as in Example 8 except that 0.02 part by weight of sodium metaphosphate (manufactured by Rasa Shouei Co., Ltd., acidic metaphosphoric acid) having a pH of an aqueous solution prepared by dissolving 1 g thereof in 100 ml of water of 1.97 was used in place of 0.02 part by weight of metaphosphoric acid. The Mw, stereocomplex crystal content (X), lactide content and terminal carboxyl group amount of the obtained composition are shown in Table 6. A heat stability test was made on the composition in the same manner as in Example 8. The measurement results are shown in Table 6.

Comparative Example 4

A composition was prepared in the same manner as in Example 8 except that the metaphosphoric acid-based deactivator was not added. The Mw, stereocomplex crystal content (X), lactide content and terminal carboxyl group amount of the obtained composition are shown in Table 6. A heat stability test was made on the composition in the same manner as in Example 8. The measurement results are shown in Table 6.

TABLE 6

| | X | Mw | | Lactide content (%) | | amount of terminal carboxyl group (eq/t) | |
| --- | --- | --- | --- | --- | --- | --- | --- |
| | | Before heat stability test | 10 minutes after heat stability test | Before heat stability test | 10 minutes after heat stability test | Before heat stability test | 10 minutes after heat stability test |
| Example 8 | 99.7 | $18.8 \times 10^4$ | $17.8 \times 10^4$ | $6.9 \times 10^4$ | $6.6 \times 10^4$ | — | — |
| Example 9 | 98.5 | $17.7 \times 10^4$ | $16.1 \times 10^4$ | $7.1 \times 10^4$ | $7.7 \times 10^4$ | 13.0 | 16.5 |
| Comparative Example 4 | 99.2 | $19.0 \times 10^4$ | $8.4 \times 10^4$ | $6.6 \times 10^4$ | $12.6 \times 10^4$ | 5.0 | 52.0 |

X: stereocomplex crystal content

Effect of the Invention

The composition of the present invention is excellent in heat stability, color and hydrolytic resistance. Therefore, even when it is heated, it rarely experiences a reduction in its molecular weight and keeps a good color. An increase in the lactide content of the composition of the present invention is very small even when it is heated.

That is, the composition of the present invention hardly generates a lactide, cyclic oligomer or chain low molecule in the step which requires heating at 180° C. or higher such as melt spinning, melt film formation or injection molding.

INDUSTRIAL FEASIBILITY

The composition of the present invention is useful as a raw material for fibers, films and molded articles.

The invention claimed is:

1. A composition comprising (i) polylactide, (ii) a metal catalyst and (iii) a metaphosphoric acid-based deactivator, wherein the metaphosphoric acid-based deactivator is at least one selected from the group consisting of an alkali metal salt, an alkali earth metal salt and an onium salt of the compound represented by the following formula:

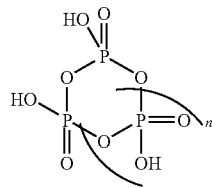

wherein n is an integer of 1 to 200,
wherein the metaphosphoric acid-based deactivator has a pH of an aqueous solution prepared by dissolving 1 g thereof in 100 ml of water of 6 or less, and
wherein the metaphosphoric acid-based deactivator is selected from the group consisting of sodium salts and potassium salts of metaphosphoric acid.

2. A composition comprising (i) polylactide, (ii) a metal catalyst and (iii) a metaphosphoric acid-based deactivator, wherein the metaphosphoric acid-based deactivator is at least one selected from the group consisting of an alkali metal salt, an alkali earth metal salt and an onium salt of the compound represented by the following formula:

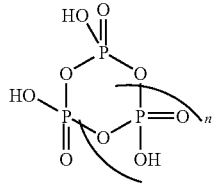

wherein n is an integer of 1 to 200,
wherein the metaphosphoric acid-based deactivator has a pH of an aqueous solution prepared by thereof in 100 ml of water of 6 or less, and
wherein the metaphosphoric acid-based deactivator is selected from the group consisting of tetraethylammonium metaphosphate, tetra-n-butylammonium metaphosphate, tetraethylphosphonium metaphosphate and tetra-n-butylphosphonium metaphosphate.

3. The composition according to claim 1, wherein the metaphosphoric acid-based deactivator is a sodium salt of metaphosphoric acid having a pH of an aqueous solution prepared by dissolving 1 g thereof in 100 ml of water of 4 or less.

4. The composition according to claim 3, wherein the metaphosphoric acid-based deactivator is a sodium salt of metaphosphoric acid having a pH of an aqueous solution prepared by dissolving 1 g thereof in 100 ml of water of 2 or less.

* * * * *